US012617198B2

(12) United States Patent
Hansford et al.

(10) Patent No.: US 12,617,198 B2
(45) Date of Patent: May 5, 2026

(54) ALIGNMENT OF SINGULATED SUBSTRATES

(71) Applicant: ASMPT SMT Singapore Pte. Ltd., Sg (SG)

(72) Inventors: Keith Michael Hansford, Dorset (GB); Simon Stuart Pape, Somerset (GB)

(73) Assignee: ASMPT SMT Singapore Pte. Ltd., Singapore (SG)

( * ) Notice: Subject to any disclaimer, the term of this patent is extended or adjusted under 35 U.S.C. 154(b) by 15 days.

(21) Appl. No.: 18/213,298

(22) Filed: Jun. 23, 2023

(65) Prior Publication Data

US 2023/0415472 A1 Dec. 28, 2023

(30) Foreign Application Priority Data

Jun. 23, 2022 (GB) ...................................... 2209248

(51) Int. Cl.
*B41F 15/18* (2006.01)
*B41F 15/08* (2006.01)
*B41F 15/26* (2006.01)
*B41F 33/00* (2006.01)

(52) U.S. Cl.
CPC .......... *B41F 15/26* (2013.01); *B41F 15/0881* (2013.01); *B41F 33/00* (2013.01); *B41P 2215/114* (2013.01)

(58) Field of Classification Search
CPC ...... B41F 15/26; B41F 15/0881; B41F 33/00; B41P 2215/114
See application file for complete search history.

(56) References Cited

U.S. PATENT DOCUMENTS

2021/0070033 A1 3/2021 Harris et al.

FOREIGN PATENT DOCUMENTS

| | | | | |
|---|---|---|---|---|
| EP | 3693168 | A1 | | 8/2020 |
| GB | 2484373 | A | | 4/2012 |
| GB | 2596517 | A | | 1/2022 |
| JP | 4281490 | | * | 6/2009 |
| JP | 2009-248551 | A | | 10/2009 |
| WO | WO 2014/166956 | A1 | | 10/2014 |

* cited by examiner

*Primary Examiner* — Christopher E Mahoney
*Assistant Examiner* — Marissa Ferguson-Samreth
(74) *Attorney, Agent, or Firm* — OSTROLENK FABER LLP

(57) ABSTRACT

Tooling for supporting workpieces during a printing operation, comprises a support tower comprising a base and a head, the head being positioned vertically above the base in use, the head being relatively moveable with respect to the base in a horizontal plane in use, the head having first and second support surfaces located at an upper end thereof, each of the first and second support surfaces being adapted to support a respective workpiece thereon, wherein the first support surface is relatively moveable with respect to the second support surface in a vertical direction in use between a printing configuration in which the first and second support surfaces are substantially coplanar in the horizontal plane, and a pre-printing configuration in which the first and second support surfaces are spaced in the vertical direction.

16 Claims, 20 Drawing Sheets

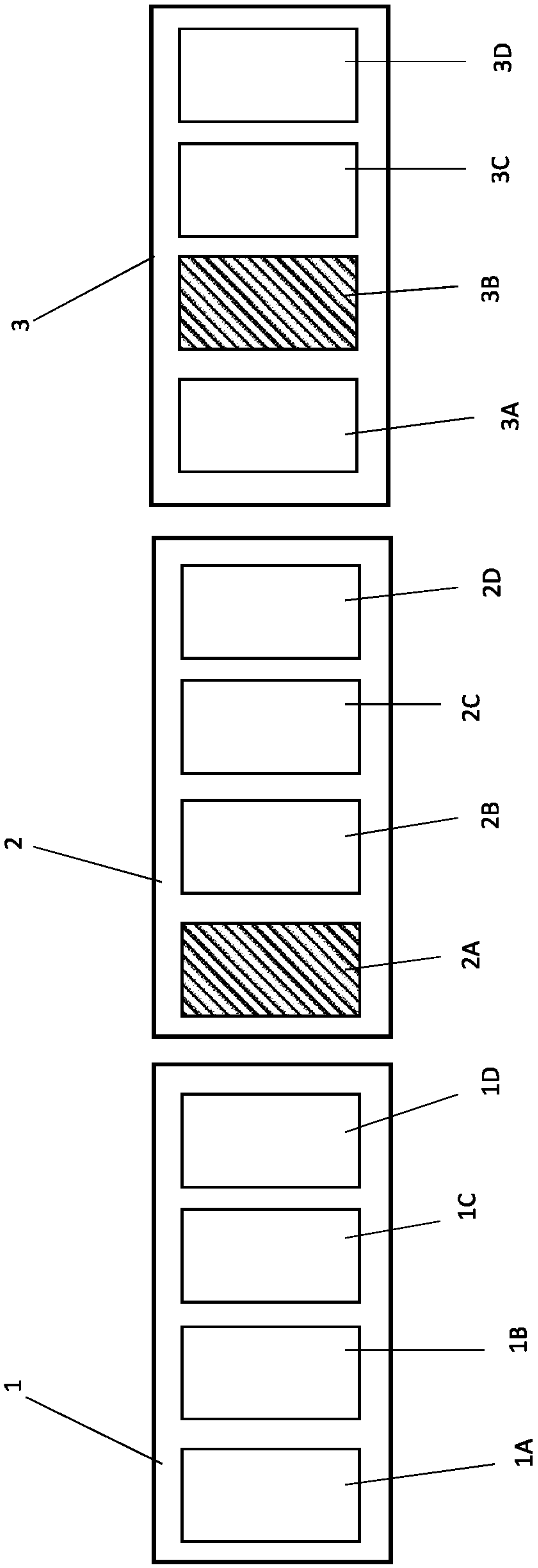
FIG. 1 - PRIOR ART

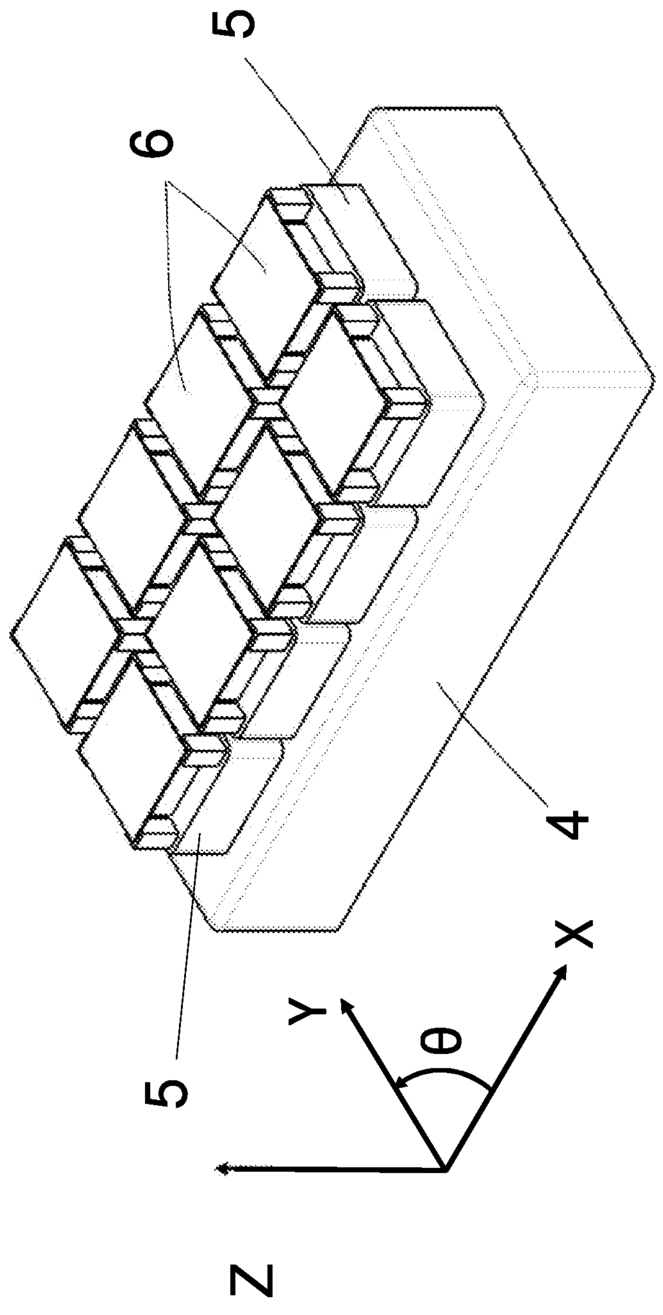
FIG. 2 - PRIOR ART

ALIGNMENT OF SINGULATED SUBSTRATES

This invention relates to tooling, a printing machine and a method of aligning workpieces prior to a printing operation.

BACKGROUND AND PRIOR ART

Industrial screen-printing machines typically apply a conductive print medium, such as solder paste or conductive ink, onto a planar workpiece, such as a circuit board, by applying the conductive print medium through a pattern of apertures in a printing screen (sometimes referred to as a foil or stencil) using an angled blade or squeegee. Where the area of the pattern is relatively small with respect to the area of the screen, it is possible to include more than one pattern within the screen, thus allowing more than one area of a board, or more than one board, to be printed simultaneously using the same screen. Alternatively, more than one relatively small screen may be used within the same printing machine to enable the more than one area of a board, or more than one board, to be printed simultaneously using respective screens. While such simultaneous printing may clearly be more efficient than sequential printing, there are problems associated with these techniques.

i) Printing of More than One Area of a Board

As noted above, it is possible to print a plurality or array of patterns onto respective areas of a single board or panel in a single print operation, to produce a plurality of printed circuit boards (PCBs) which may be subsequently physically separated. This technique is conceptually and technically simple—a panel with a plurality of boards is loaded into a printing machine, correctly aligned and then all the boards of the panel are printed simultaneously. However, with any circuit board there is a risk that at least part of that board may be defective, which in turn may lead to a defective PCB. This situation is schematically shown in FIG. 1, where three panels 1, 2, 3 are shown, each having a 4×1 array of boards A-D. While the left-most panel 1 is completely free from defects, the adjacent panel 2 has a defective board 2A, while the right-most panel 3 has a defective board 3B. It is inefficient to pre-check the circuit boards for defects and reject an entire panel if one board is found to be defective. It is also inefficient and problematic to print a pattern onto an identified defective board and reject the separated defective board subsequent to the printing process. One current solution to this problem is to identify defective boards before commencement of the printing operation, and sort the panels into separate batches having similar defects, for example a first batch which is defect-free, a second batch in which the left-most board is defective, a third batch in which the second-left board is defective and so on. A dedicated respective screen may then be used with each batch. For example, a screen having all four aperture patterns would be used for the first batch, while screens having only three aperture patterns would be used for each remaining batch. For the 4×1 array described here, this would result in the use of five different screens per panel to print on a side of the panel. Since each panel will typically be printed on both sides, this could lead to the use of ten different set-ups for a single panel type, rather than the optimal two (i.e. one for each side). In addition, the second to fifth batches will only be printing at 75% efficiency. Furthermore, if two or more boards are defective then additional measures must be taken.

ii) Printing of More than One Board

A solution to the above problem is to pre-separate or "singulate" the individual boards before the printing process. Here, any defective boards could be identified before printing and rejected immediately, so that only non-defective boards are printed. While this process is relatively efficient, it introduces complications. In particular, it is difficult both to support and to align individual relatively small boards for simultaneous (or sequential) printing.

Various approaches have been developed to overcome these problems. For example, GB 2484373 A describes a method in which individual boards are respectively positioned, but this only permits the sequential printing of one substrate at a time. JP-2009-248551 describes a method in which the position of each board is checked individually, and each board is sequentially repositioned using a repositioning arm. While this technique permits all boards of a panel to be printed on simultaneously, additional apparatus (i.e. the positioning arm) is required, and moving the arm between workpieces is time-consuming. WO2014/166956 describes an alternative apparatus, in which all boards may be aligned simultaneously using a reference webbing, and then simultaneously printed. This solution works well, though will not be suitable if an incoming unprinted board is positioned too far from its correct position.

A workpiece support assembly, capable of supporting and individually aligning a multiplicity of relatively small workpieces (commonly referred to as "singulated" workpieces) has been described in EP3693168A1. FIG. 2 schematically shows an example of such an assembly 4, here including a 2×4 array of individual support "towers" 5. Each tower 5 is topped with a support surface 6 upon which a workpiece (not shown) may be supported during a printing operation. Furthermore, each tower 5 is individually actuable to move in orthogonal directions X and Y, which would typically be in the horizontal plane, and also to rotate about an orthogonal Z axis, which would typically extend in the vertical direction to provide so-called theta correction. As described in EP3693168A1, such movement may be advantageously provided through the use of a parallel kinematic actuation system within each tower. Other arrays of greater or smaller dimension are of course possible. This system has been released by ASM under the name "MASS", and provides a very fast and accurate printing solution. In an extension of the MASS methodology, GB2596517A describes how such apparatus may be used to print a plurality of singulated substrates which are arranged at pitches in the transport direction that are smaller than the spacing of individual support towers. Furthermore, in a yet further extension of the MASS methodology, GB Application No. 2117575.7 describes how such apparatus may be used to print a plurality of singulated substrates which are arranged at pitches orthogonal to the transport direction that are smaller than the spacing of individual support towers.

However, a problem exists in that, even using the methodology as set out in GB2596517A and GB Application No. 2117575.7, there is a lower limit to the pitch of a singulated workpiece array printable—if the workpieces or pitch are so small that more than one workpiece overlies an upper support surface of a single support tower, the MASS system is not suitable.

The present invention seeks to overcome this problem and enable the use of a support tower tooling system, such as MASS, with all currently-used arrays of singulated workpieces. In particular, it is an aim of the present invention to provide apparatus and methodology to align singulated workpieces with an aperture pattern of a patterned printing screen while the workpieces are located inside a printing machine and prior to conducting a printing operation, using such a support tower tooling system. The present invention therefore enables printing of singulated workpieces housed in all standard carrier trays, such as "JEDEC" trays, using 'MASS-type' tooling.

In accordance with the present invention, this aim is achieved by providing each support tower with a plurality of support surfaces, each support surface of the plurality being arranged at a differential height profile in a pre-printing configuration, so that lifting of the or each support tower causes individual workpieces to be contacted from below in a staggered manner, so that they can be individually aligned.

SUMMARY OF THE INVENTION

In accordance with a first aspect of the present invention there is provided tooling for supporting workpieces during a printing operation, comprising:

a support tower comprising a base and a head, the head being positioned vertically above the base in use, the head being relatively moveable with respect to the base in a horizontal plane in use, the head having first and second support surfaces located at an upper end thereof, each of the first and second support surfaces being adapted to support a respective workpiece thereon, wherein the first support surface is relatively moveable with respect to the second support surface in a vertical direction in use between a printing configuration in which the first and second support surfaces are substantially coplanar in the horizontal plane, and a pre-printing configuration in which the first and second support surfaces are spaced in the vertical direction.

In accordance with a second aspect of the present invention there is provided a printing machine for printing workpieces at a printing location within the printing machine, comprising:

a transport system configured to transport workpieces into the printing machine and to the printing location, and then, following completion of a printing operation, out of the printing machine;

a printing screen support for holding a patterned printing screen above the printing location;

a tooling table located underneath the printing location, the tooling table being drivable towards and away from the printing location; and the tooling of the first aspect mounted on the tooling table.

In accordance with a third aspect of the present invention there is provided a method of aligning workpieces prior to a printing operation, comprising the steps of:

i) providing tooling within the printing machine beneath a printing location within the printing machine, the tooling comprising at least one support tower with at least first and second support surfaces located at an upper end thereof, each of the at least first and second support surfaces being adapted to support a respective workpiece thereon, the first support surface being higher than the second surface;

ii) transporting the workpieces to the printing location such that they overlie respective support surfaces of the tooling;

iii) moving the upper end of the support tower in the horizontal plane such that the first support surface aligns with its respective overlying workpiece;

iv) lifting the tooling so that the first support surface is brought into supporting contact with its respective overlying workpiece;

v) moving the upper end of the support tower in the horizontal plane such that the second support surface aligns with its respective overlying workpiece;

vi) lifting the tooling so that the second support surface is brought into supporting contact with its respective overlying workpiece; and vii) moving the upper end of the support tower in the horizontal plane such that the workpieces supported on respective first and second support surfaces are aligned for the printing operation.

Other specific aspects and features of the present invention are set out in the accompanying claims.

BRIEF DESCRIPTION OF THE DRAWINGS

The invention will now be described with reference to the accompanying drawings (not to scale), in which:

FIG. 1 schematically shows three panels, each holding four boards;

FIG. 2 schematically shows a known multiple tower support system;

FIGS. 3A-9A schematically show an alignment method according to the present invention from above;

FIGS. 3B-9B schematically show corresponding method step to FIG. 3A-XA, but in a side view;

DETAILED DESCRIPTION OF THE PREFERRED EMBODIMENTS OF THE INVENTION

An alignment method in accordance with the present invention is schematically shown in FIGS. 3A to 9B.

Figures 3A, 3B:
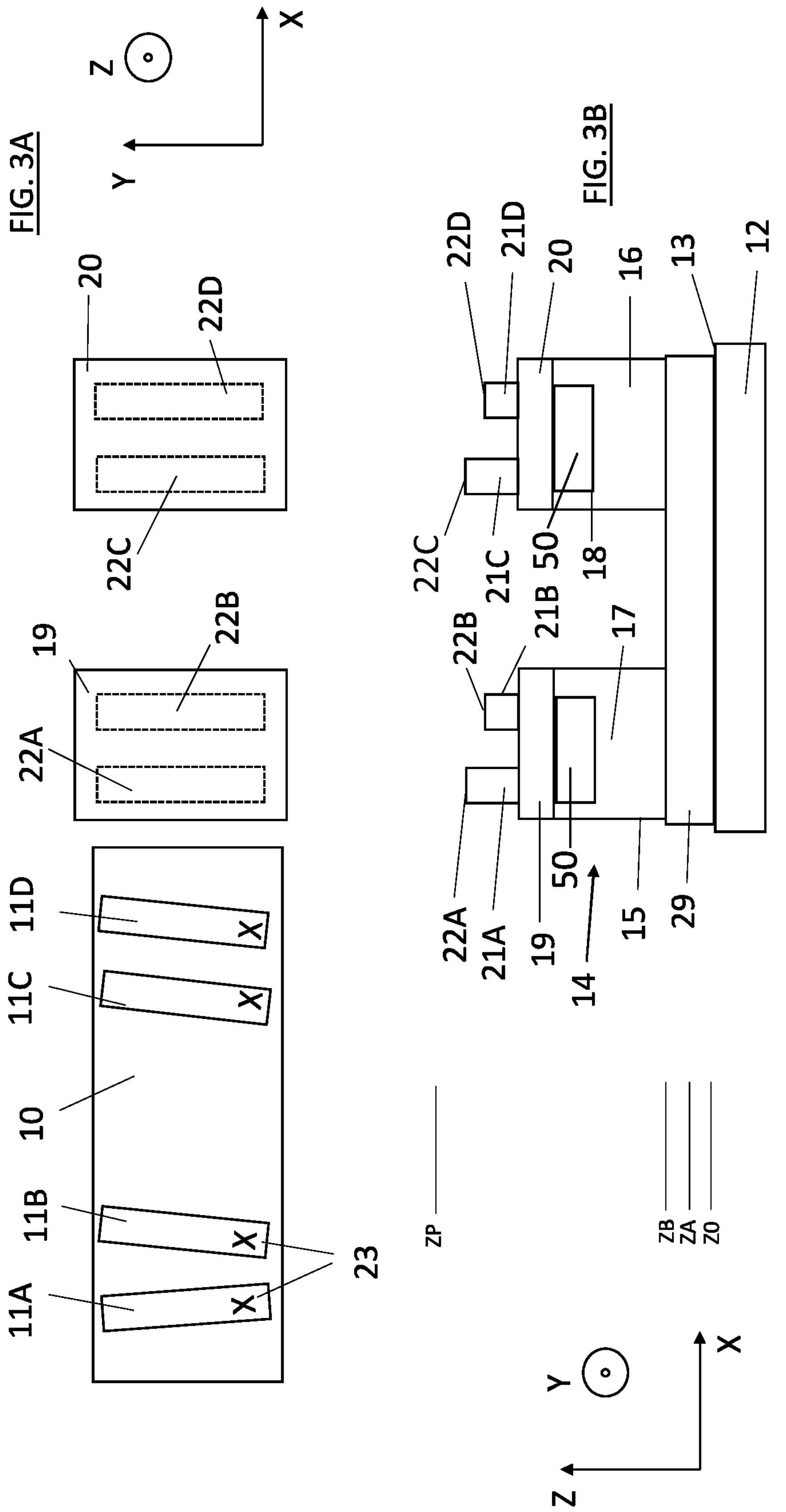

FIGS. 3A, 3B show an initial stage of the method, in which a carrier 10, such as a JEDEC tray, external to a printing machine (28, see FIG. 4B) is to be transported to a printing location by a transport system (not shown) of the printing machine 28. As is well-known in the art, such a transport system may typically comprise a number of conveyors (not shown) which the carrier 10 may directly rest on, the conveyors configured to move, in a horizontal plane and in the X direction shown, a carrier 10 loaded with unprinted workpieces 11 from an input to the printing machine 28, then to the printing location, and, following completion of a printing operation in which print medium such as solder paste is transferred onto an upper surface of the workpieces, to an output of the printing machine 28. Although not shown in these figures, the carrier 10 may then be transported to other parts of a production line as required, for example to a placement machine, inspection machine or reflow oven. As will be understood by those skilled in the art, the printing machine 28, including its transport system, is controlled by a control system running sophisticated software via suitably programmed processors, computers or the like.

As shown in FIG. 3A, in this example carrier 10 is loaded with four unprinted, singulated workpieces 11, labelled 11A-11D. These workpieces 11 may not be well-aligned within the carrier 10, although it should be noted that the amount of misalignment shown in FIG. 3A is exaggerated for clarity. Each workpiece 11 is provided, in a fixed and preset location, with at least one workpiece fiducial 23, a graphical symbol that can be easily recognised by an optical sensor.

The printing machine 28 comprises a tooling table 12, which includes a tooling table upper surface 13, this being flat and aligned in the horizontal (X, Y) plane as shown. The tooling table 12 is drivable in the vertical direction, i.e. both parallel and antiparallel to the Z axis as shown, by a drive mechanism (not shown). In particular, the tooling table 12 is at least drivable between a lowest position in which the tooling table upper surface 13 is at a height Z0 shown and a highest position in which the tooling table upper surface 13 is at a height ZP shown, which range includes intermediate heights ZA and ZB as shown. The height difference between ZB and ZA is greater than the thickness of a workpiece 11.

Tooling 14 is mounted to the tooling table upper surface 13, for vertical movement with the tooling table 12. In the example shown, the tooling comprises two support towers 15, 16, projecting upwardly from an assembly unit 29. The assembly unit 29 comprises control circuitry for controlling movement of the support towers 15, 16, as will be described in more detail below. These support towers 15, 16 are both of the "MASS" type described previously, comprising respective bases 17, 18 and heads 19, 20 positioned vertically above the bases 17, 18. Each head 19, 20 is relatively moveable with respect to its respective base 17, 18 in a horizontal (X, Y) plane. Being MASS-type towers, each base 17, 18 comprises an actuator 50 for driving the respective head in the horizontal plane relative to the base 17, 18, and in this embodiment the actuator is operative to drive the respective head 19, 20 in orthogonal X and Y directions within the horizontal plane, and also to rotate the respective head 19, 20 about a vertical axis parallel to the Z-axis shown. Advantageously, the actuators may be parallel kinematic actuators to provide such movement while remaining compact in size, as described in EP3693168A1. The support towers 15, 16 are provided with vacuum connections, so that the respective heads 19, 20 may be selectively supplied with an at least partial vacuum supplied by a separately provided vacuum pump (not shown) located elsewhere in the printing machine 28. Each head 19, 20 is fitted with first and second supports arranged in a linear array, with head 19 being provided with supports 21A, 21B, while head 20 is provided with supports 21C and 21D. Each support 21A-D has a respective support surface 22A-D at an upper end thereof, with each of these support surfaces being adapted to support a single respective workpiece 11A-D thereon. Each of the support surfaces 22A-D is provided with at least one opening (not shown) for selectively supplying an at least partial vacuum to a workpiece 11A-D when it is supported thereon, to anchor the workpiece to the respective supporting support surface. The vacuum supply to each opening is received from the respective head 19, 20. The opening may optionally comprise a gauze-type material. As a further alternative, the support surfaces 22A-D may optionally comprise sintered material through which vacuum may be supplied. For each support tower 15, 16, a first one of the support surfaces, i.e. support surfaces 22A and 22C, is relatively moveable with respect to the second one of the support surfaces, i.e. support surfaces 22B, 22D, only in a vertical direction (parallel to the Z-axis) in use. As shown, the first support surfaces 22A, 22C are located in a pre-printing configuration in which the first (22A, 22C) and second (22B, 22D) support surfaces are spaced in the vertical direction (parallel to the Z-axis), i.e. the first support surfaces 22A, 22C are vertically higher than the second support surfaces 22B, 22D by a distance ZB-ZA. The first support surfaces 22A, 22C may be moved downwards to a printing configuration (see FIG. 9B) in which they are substantially coplanar in the horizontal (X, Y) plane with the second support surfaces 22B, 22D. As can be more clearly seen from above in FIG. 3A, each support surface 22A-D has a shape and dimension selected to generally correspond with that of a workpiece 11, so that it can provide adequate support therefor. For clarity, in all of the views from above, such as FIG. 3A, the support surfaces 22A-D are shown with dashed lines. Also for clarity, the surround plate (24, see FIG. 4B) which would be present within the printing machine 28, has been omitted. Similarly, the surround plate 24 is omitted from all of the views from above, i.e. FIGS. 3A to 9A.

Figure 4A:
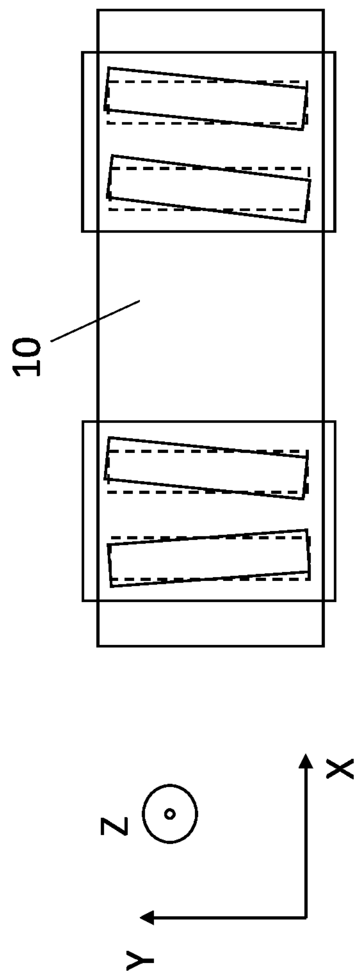
Figure 4B:
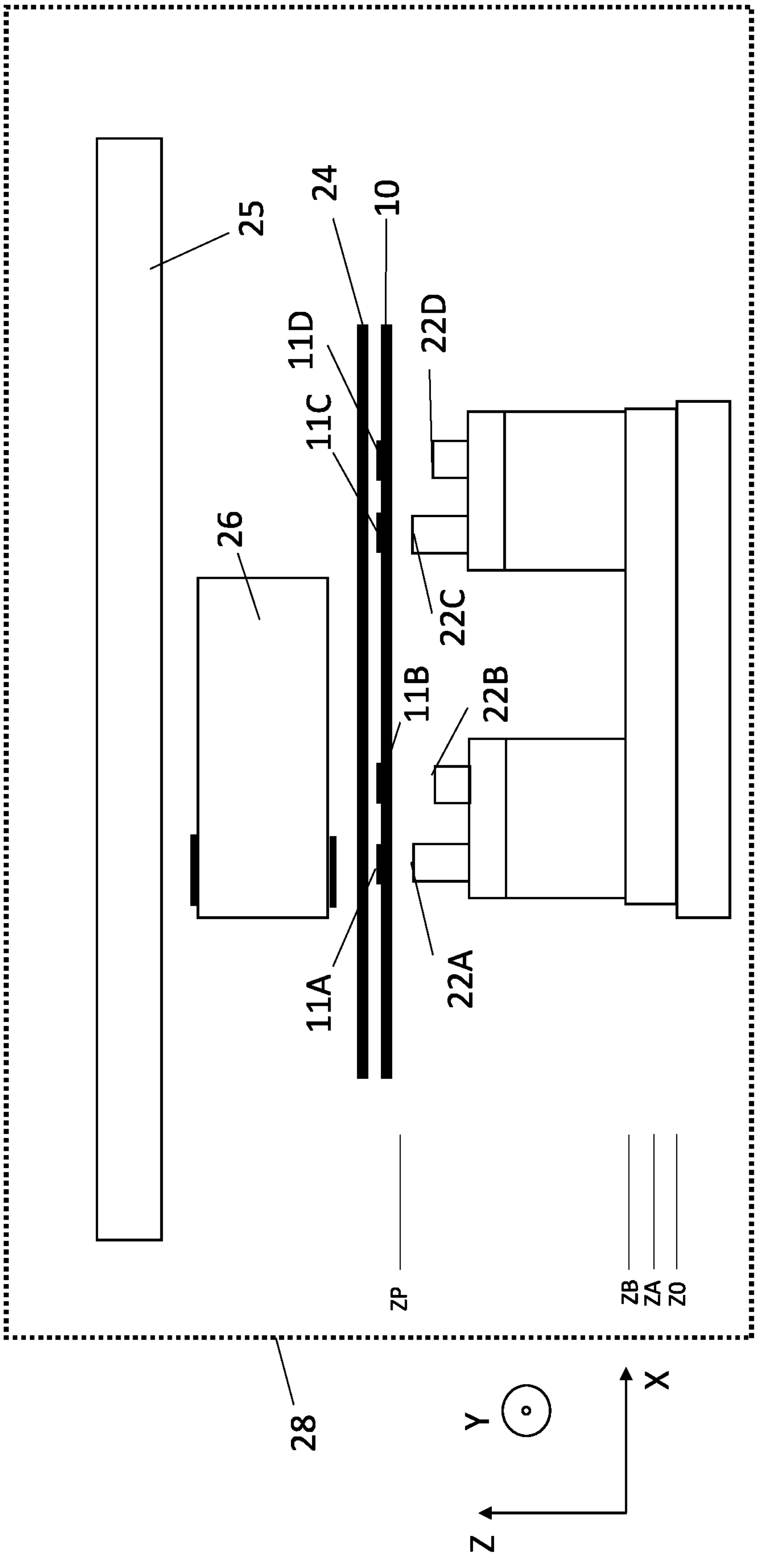
Figure 10:
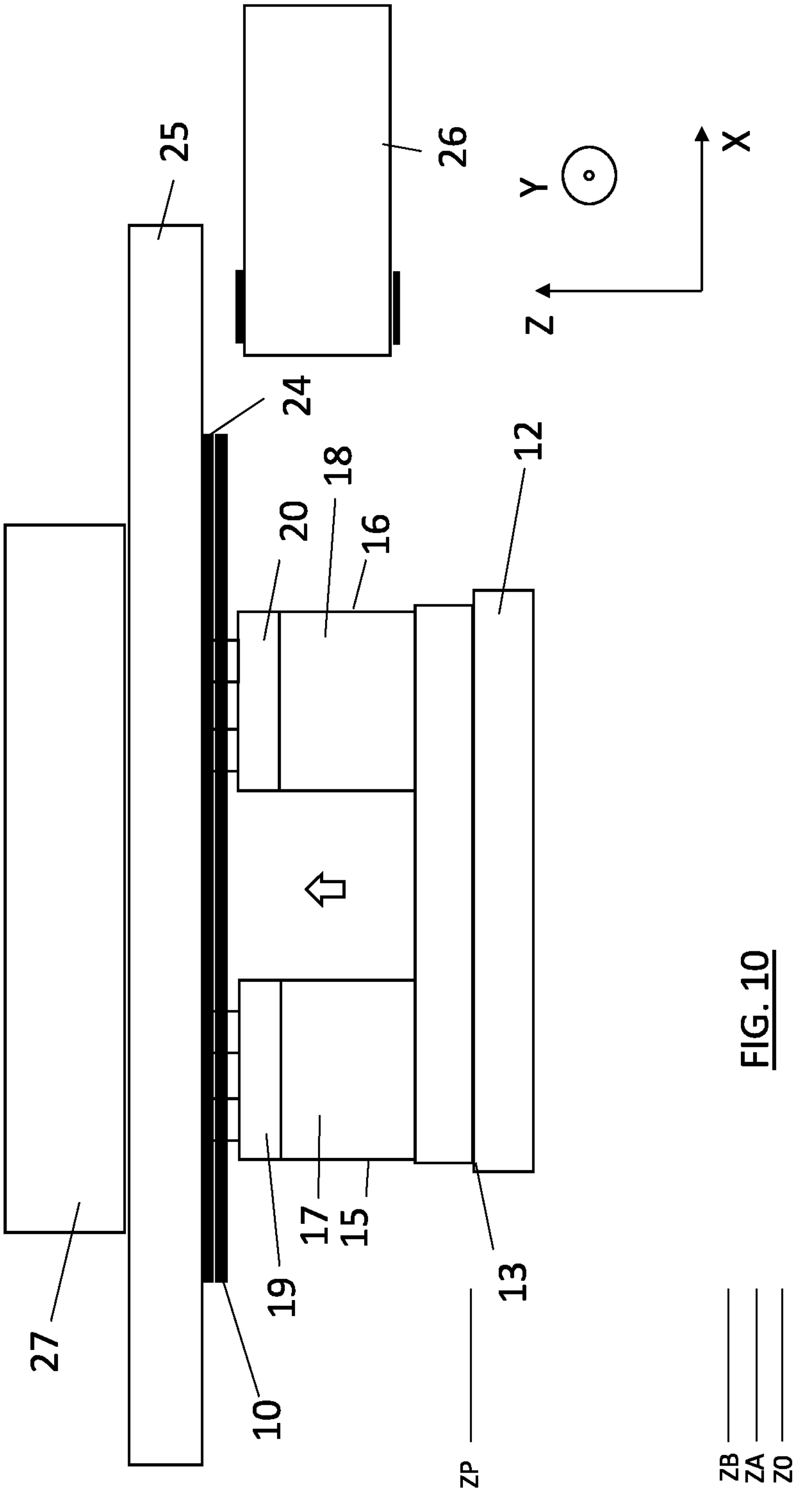
FIG. 10 schematically shows, in a side view, printing apparatus during a printing operation.

As shown in FIGS. 4A, 4B, the carrier 10 is transported to the printing location in which the unprinted workpieces 11A-D overlie respective support surfaces 22A-D. It can be seen from FIG. 4A that the workpieces 11A-D are all misaligned with their underlying support surfaces 22A-D. FIG. 4B more clearly shows the relative positioning of parts within the printing machine 28. In the printing location, the carrier 10 is located beneath a surround plate 24, which is rigidly fixed to vertically-drivable rails (not shown) within the printing machine 28. As is well-known in the art, a surround plate is a flat plate with apertures formed therein to receive respective singulated workpieces 11. The top surface of the surround plate 24 is arranged to be co-planar with the upper surfaces of the workpieces 11 during a printing operation, to prevent undue stress being placed on the workpieces 11 by the downward pressure applied by a squeegee (27, see FIG. 10). Above the surround plate 24 is a printing screen or stencil 25 which is rigidly fixed within the printing machine 28 and patterned with apertures corresponding to the desired target print pattern for the workpieces 11. During a printing operation, a squeegee (27, see FIG. 10) runs across the top of the printing screen 25 to force print medium through the apertures and onto the workpieces 11. In the pre-printing configuration shown, and in the tooling table upper surface 13 is at height Z0, there is sufficient space between the surround plate 24 and the printing screen 25 for a camera 26 of a camera system to be positioned. In this stage of the method, the camera 26 is positioned above each workpiece 11A-D in turn, to capture each respective workpiece fiducial 23 (see FIG. 3A). The camera 26 may for example by fitted to a movable gantry (not shown) or arm to move it across the carrier 10. In alternative embodiments (not shown), it may be possible to use a camera system capable of capturing the workpiece fiducials 23 of more than one workpiece 11A-D simultaneously. In either case, data associated with the captured fiducials is passed to the control system and processed to determine the position of each workpiece 11A-D in the horizontal (X, Y) plane as well as its orientation about a vertical axis parallel to the Z-axis, which is referred to as its θ rotation. Following capture of all of the workpiece fiducials 23, the camera 26 is moved to a retracted position horizontally spaced from the carrier 10, so as not to interfere with subsequent movement of the tooling table 12, as shown in FIG. 10.

Figure 5A:
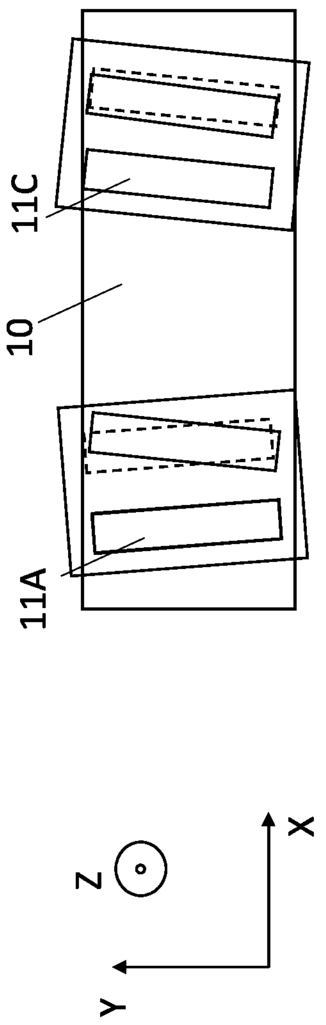

As shown from above in FIG. 5A, each support tower 15, 16 is then independently driven (i.e. the heads 19, 20 are independently driven with respect to their bases 17, 18) such that the respective underlying first support surfaces 22A, 22C are brought into alignment with their respective overlying workpieces 11A, 11C, using the workpiece positions determined in the previous step. It will be understood that the position of each support tower 15, 16 can be accurately controlled and determined through the use of suitable encoders in each support tower 15, 16. It should also be understood that since the movement of the heads 17, 18 is small, the resulting displacement of the heads 17, 18 and supports 21A-D is not discernible in FIG. 5B.

Figure 6A:
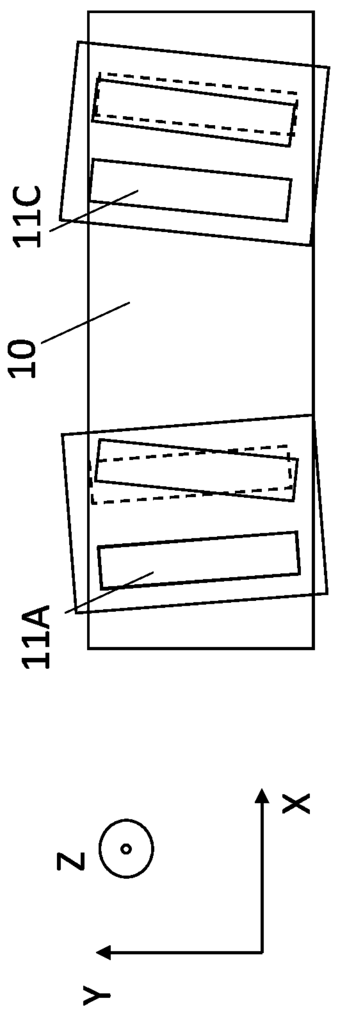
Figure 6B:
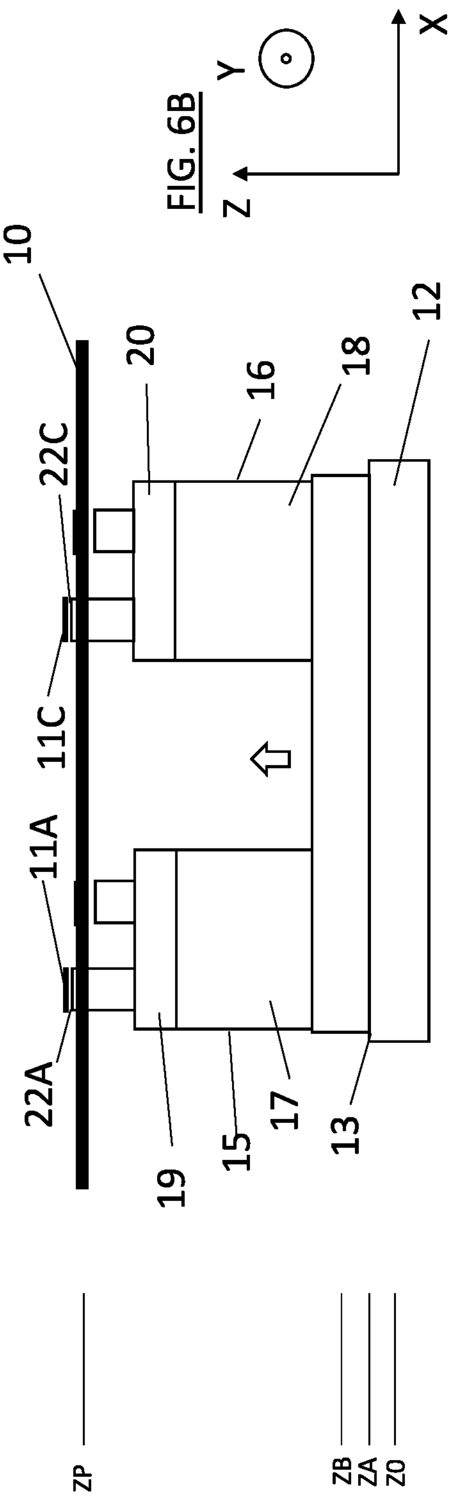

As shown in FIGS. 6A, 6B, once the first support surfaces 22A, 22C are aligned with workpieces 11A, 11C, the tooling table 12 is raised so that the first support surfaces 22A, 22C are brought into contact with the respective workpieces 11A, 11C and lift them out of engagement with the carrier 10. This corresponds with lifting the tooling table upper surface 13 to height ZA as shown. An at least partial vacuum is supplied to the first support surfaces 22A, 22C to securely adhere the respective workpieces 11A, 11C thereto. The at least partial vacuum is applied until completion of the printing operation.

Figure 7A:
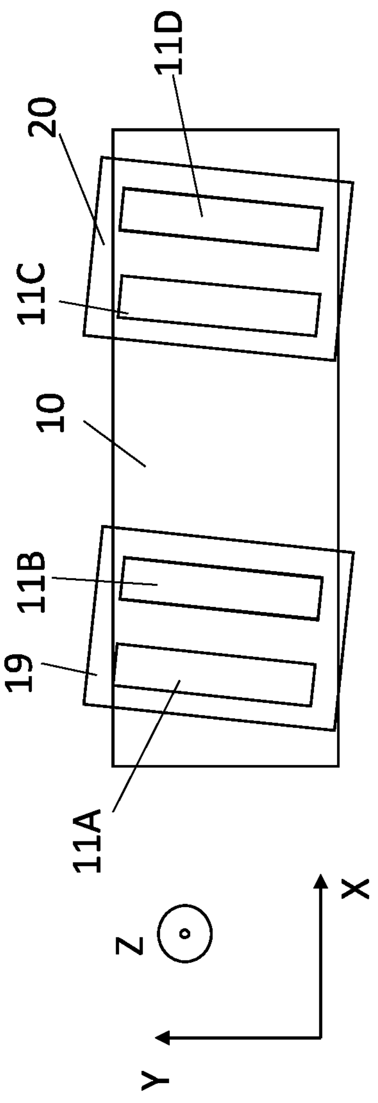
Figure 7B:
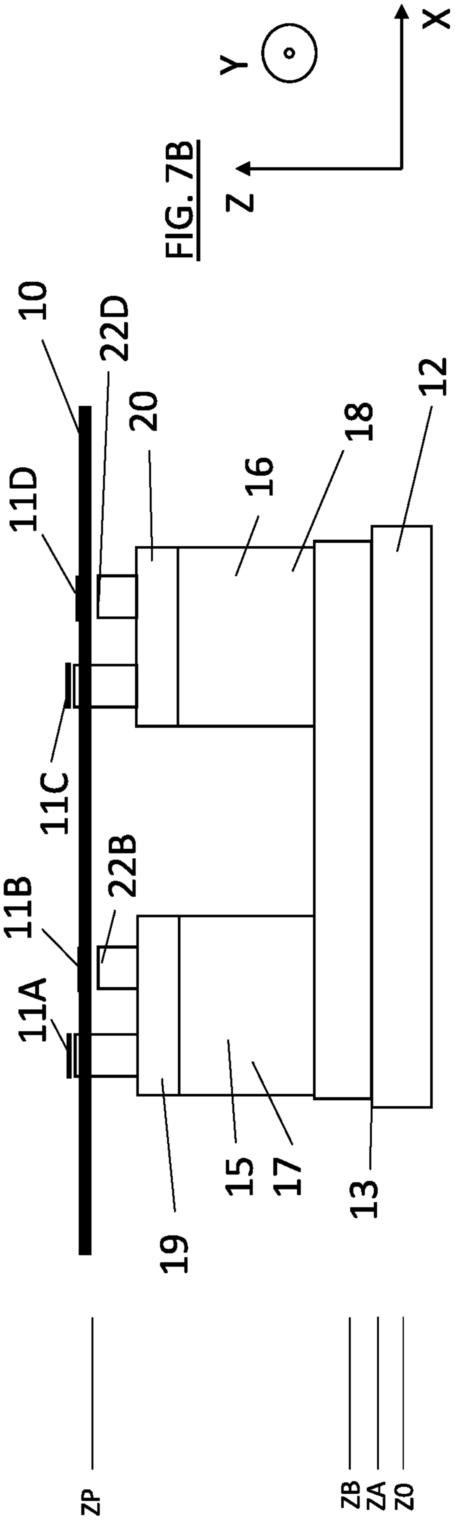

Then, as shown in FIGS. 7A, 7B, each support tower 15, 16 is then independently driven (i.e. the heads 19, 20 are independently driven with respect to their bases 17, 18) such that the respective underlying second support surfaces 22B, 22D are brought into alignment with their respective overlying workpieces 11B, 11D, using the workpiece positions determined previously. Since the movement of the heads 17, 18 is small, the resulting displacement of the heads 17, 18 and supports 21A-D is not discernible in FIG. 7B.

Figure 5B:
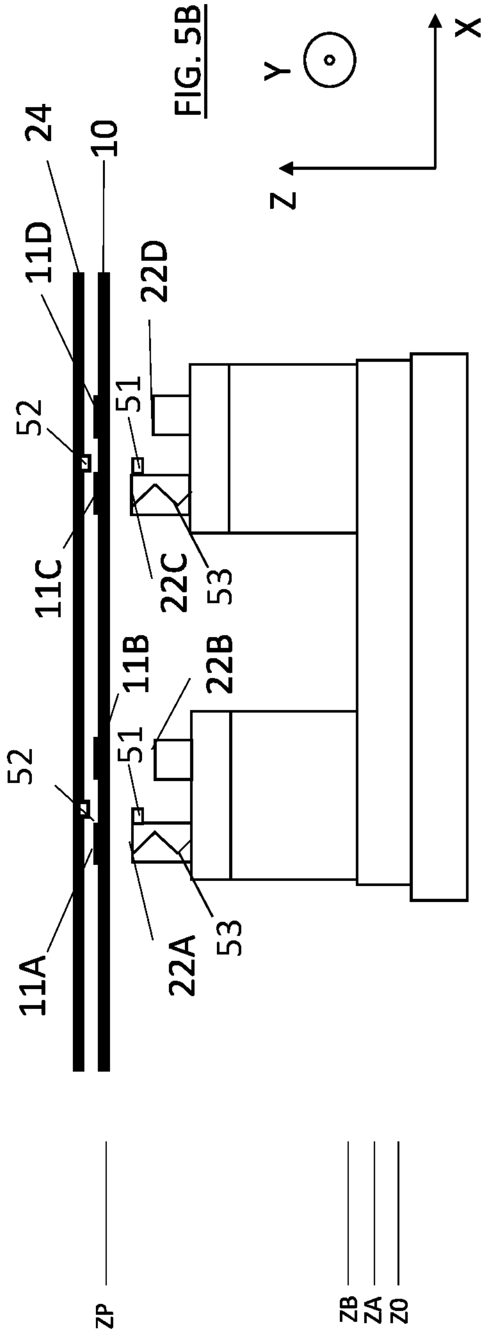
Figure 8A:
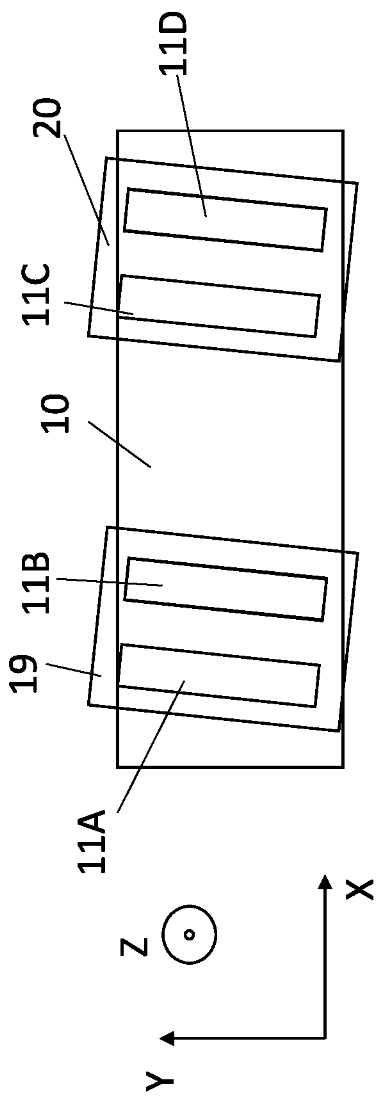
Figure 8B:
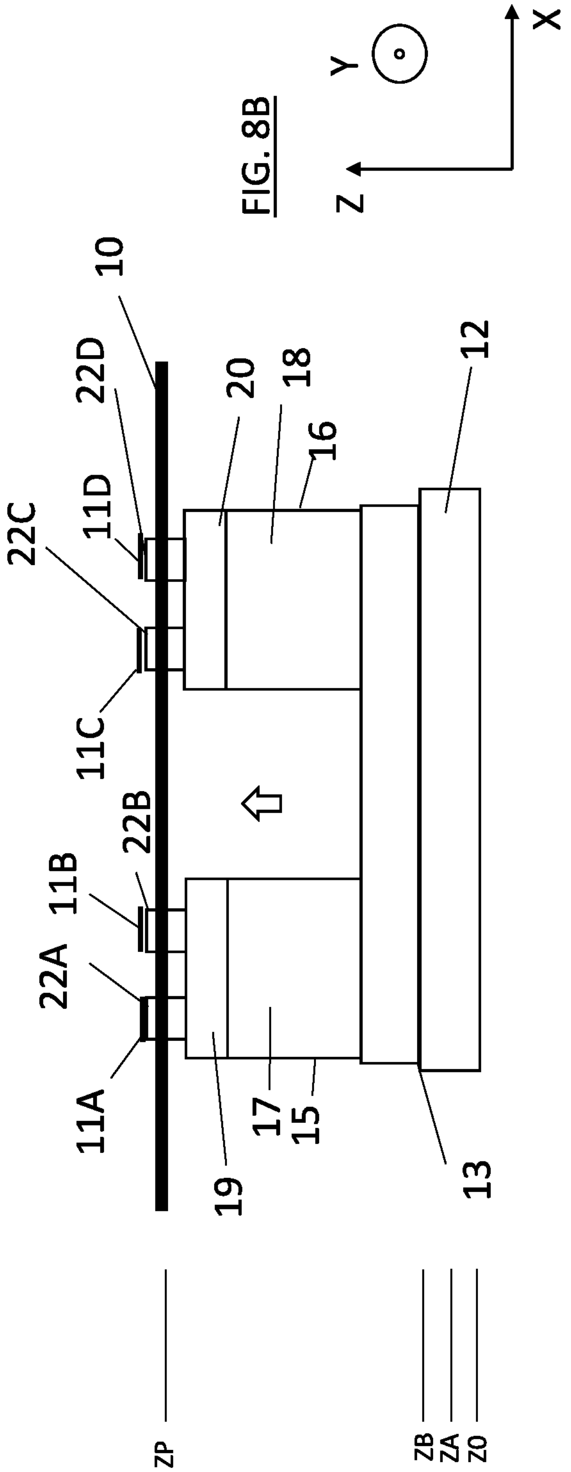

As shown in FIGS. 8A, 8B, once the second support surfaces 22B, 22D are aligned with workpieces 11B, 11D, the tooling table 12 is further raised so that the second support surfaces 22B, 22D are brought into contact with the respective workpieces 11B, 11D and lift them out of engagement with the carrier 10. This corresponds with lifting the tooling table upper surface 13 to height ZB as shown. An at least partial vacuum is supplied to the second support surfaces 22B, 22D to securely adhere the respective workpieces 11B, 11D thereto. The at least partial vacuum is applied until completion of the printing operation. During this lifting, the first support surfaces 22A, 22C are caused to remain at a constant absolute height, rather than moving up with the tooling table 12, so that they move relatively closer to the second support surfaces 22B, 22D as these lift, until all the support surfaces 22A-D are substantially coplanar in the horizontal plane, at which point the first support surfaces 22A, 22C are in a printing configuration. There are various ways in which the first support surfaces 22A, 22C may be caused to move to the printing configuration. For example, each of the first support surfaces 22A, 22C may be driveable between its printing and pre-printing configurations. This could be achieved by providing a Z-axis actuator within each of the first supports 21A, 21C or support towers, particularly within the respective head 19, 20, operative to drive the respective first support surface 22A, 22C downwards relative to the respective second surfaces 22B, 22D. However, a simpler solution is to constrain each of the first support surfaces 22A, 22C from rising further up with the tooling table 12 once the tooling table upper surface 13 passes height ZA. This may be achieved for example by resiliently biasing each of the first support surfaces 22A, 22C to the pre-printing configuration (i.e. to its maximum vertical height), for example by connecting each of the first support surfaces 22A, 22C to its respective head 19, 20 via a compression spring 53 (see FIG. 5B). A projection 51 (see FIG. 5B) may be provided at each first support surface 22A, 22C for abutting with an external limiting member 52 (see FIG. 5B), such that lifting of the first support surface 22A, 22C is prevented during lifting of the support tower 15, 16 when the projection abuts with the external limiting member. In a preferred embodiment, and as shown in FIG. 5B, the limiting member 52 may comprise at least part of the surround plate 24, i.e. either a member provided on the surround plate specifically for abutting with the projection, or the projection is dimensioned to abut with a 'normal' surround plate itself, which does not include any additional member provided for this purpose.

Figure 9A:
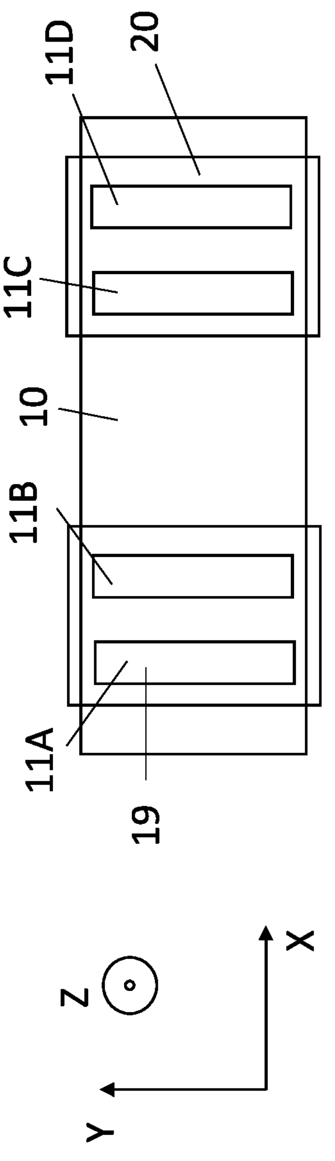
Figure 9B:
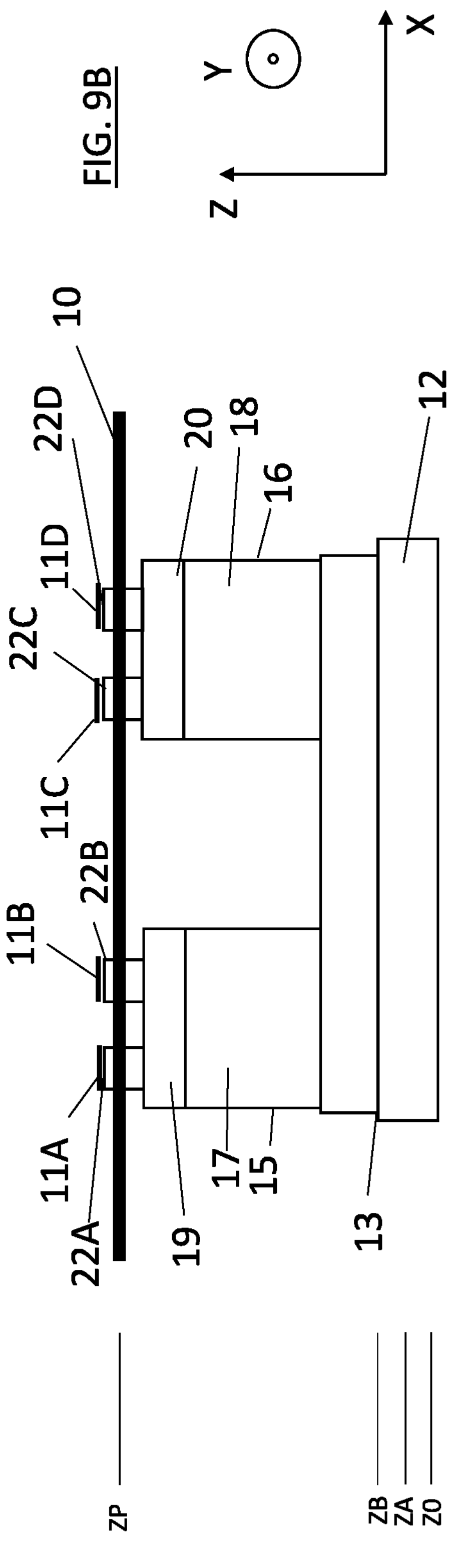

Then, as shown in FIGS. 9A, 9B, each support tower 15, 16 is then independently driven (i.e. the heads 19, 20 are independently driven with respect to their bases 17, 18) such that all of the support surfaces 22A-D with their respective supported workpieces 11A-D are brought into the correct alignment, i.e. into alignment with the aperture pattern of the printing screen (25, see FIG. 4B). Since the movement of the heads 17, 18 is small, the resulting displacement of the heads 17, 18 is not discernible in FIG. 9B.

At the conclusion of this previous step, the alignment method is completed. It is now possible to print onto all of the workpieces 11A-D in a single print operation. As shown in FIG. 10, once all of the workpieces 11A-D are correctly aligned, the tooling table 12 is further raised to its print height, at which the tooling table upper surface 13 is at height ZP. This lifting of the tooling table 12 causes both the carrier 10 and the surround plate 24 to also be lifted, as is well-known in the art. When the tooling table 12 is fully lifted to the print height, the workpieces 11A-D and the surround plate 24 are pressed against the underside of the printing screen 25, with the upper sides of the workpieces 11A-D co-planar with the upper surface of the surround plate 24. Since the surround plate 24 lifts with the tooling table 12, the first support surfaces 22A, 22C will remain in their printing configuration throughout the lifting. Camera 26 is shown in a retracted position in which it does not interfere with the lifting of the tooling table 12. Once the tooling table 12 is lifted to its print height, a squeegee 27 may be drawn across the upper surface of the printing screen 25 to impel printing medium through the apertures of the printing screen 25 and onto the workpieces 11A-D, as is well-known in the art per se.

Figure 11:
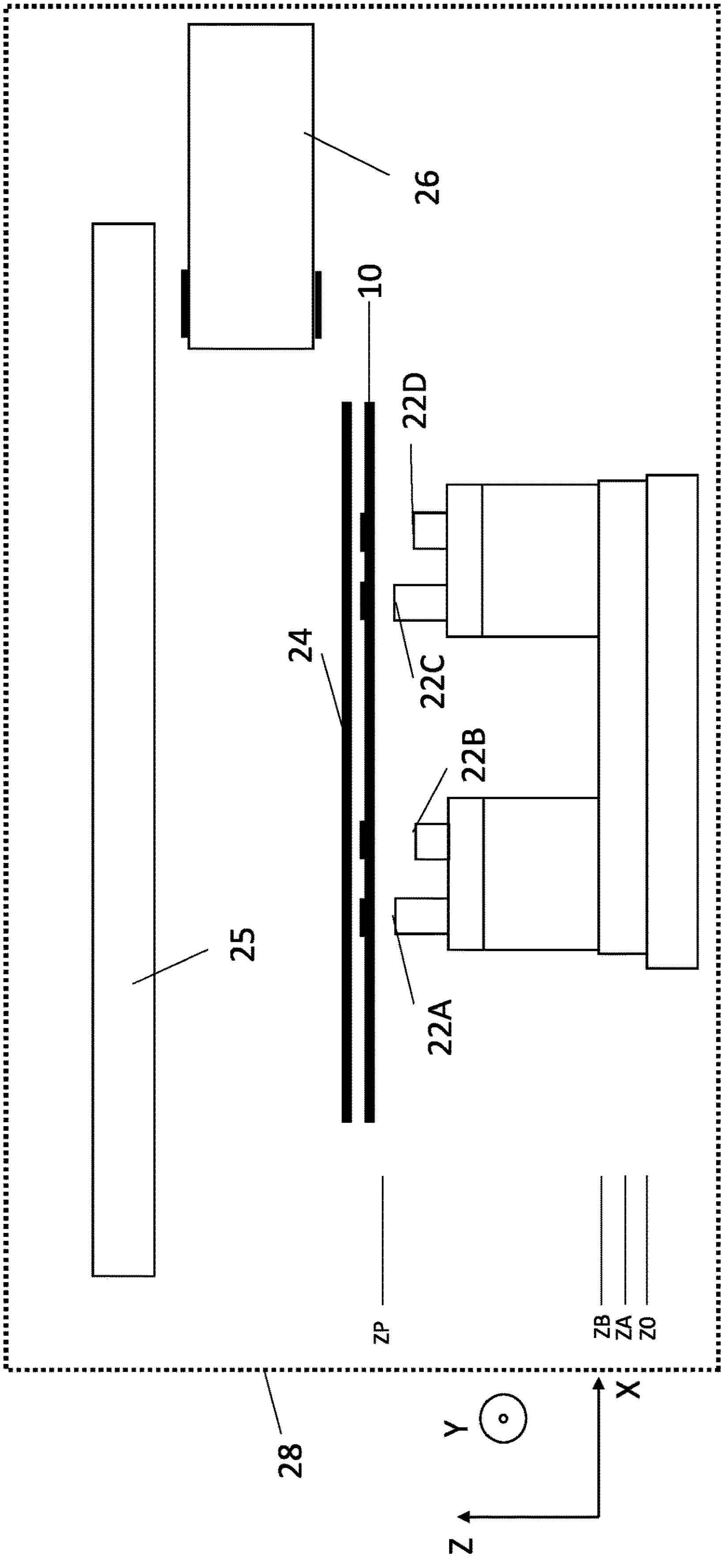
FIG. 11 schematically shows, in a side view, printing apparatus following the printing operation of FIG. 10.

Following completion of the printing operation, the tooling table 12 is lowered so that the tooling table upper surface 13 returns to height Z0, and the printed workpieces are returned to the carrier 10. This position is shown from the side in FIG. 11.

The transport system may then transport the loaded carrier 10 along the positive X direction shown, to the printing machine output, and hence on to other modules of a production line as required.

The above-described example shows a simple embodiment of the present invention, however the invention is not limited to that specific embodiment. In particular, there is great flexibility in the possible arrangements both of the support towers and of support surfaces on the support towers.

Figures 12A, 12B:
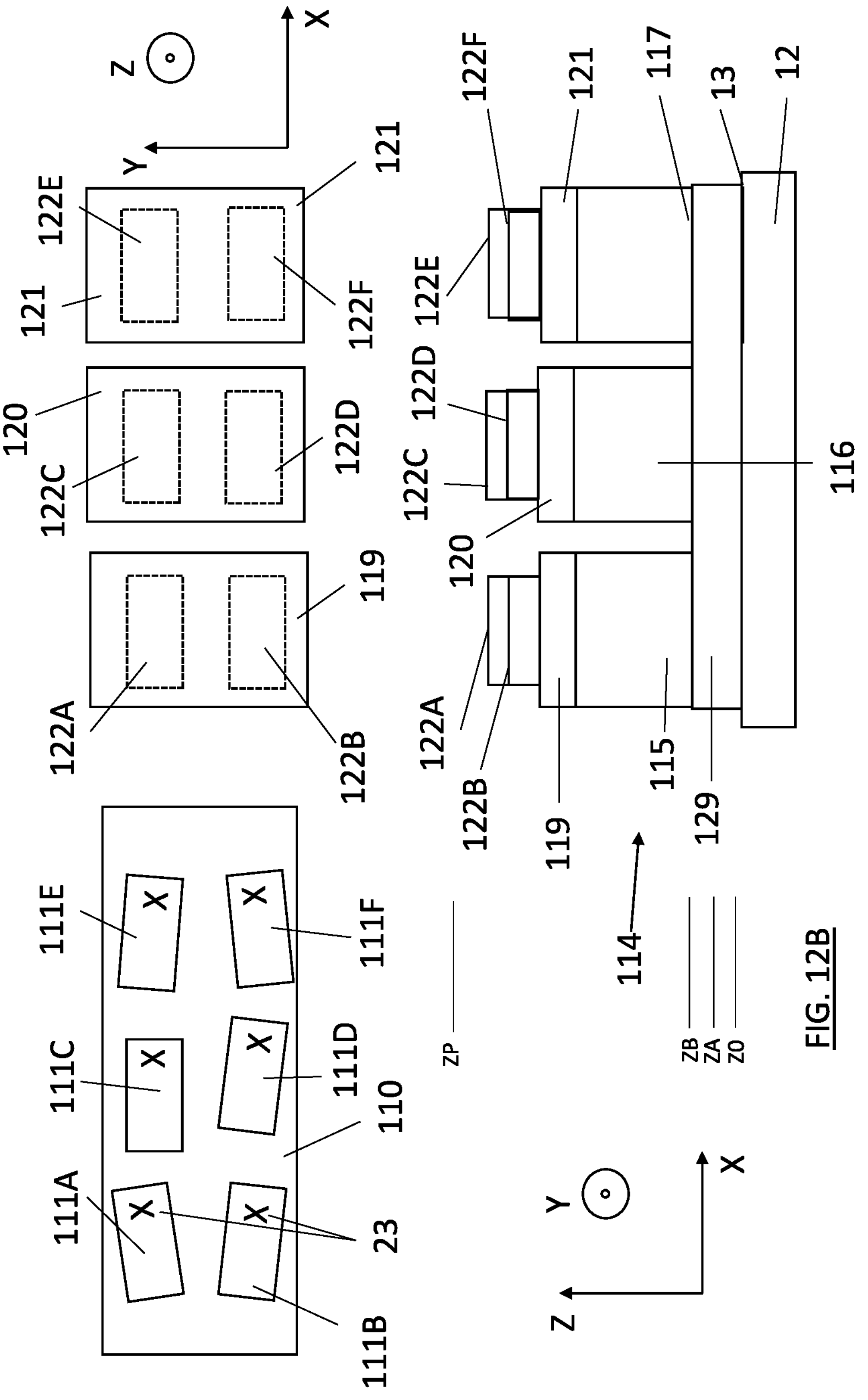
FIGS. 12A and 12B schematically show, from above and in a side view respectively, tooling in accordance with another embodiment of the present invention.

As an example, FIGS. 12A and 12B schematically show, from above and in side view respectively, tooling 114 suitable for use in printing a batch of six workpieces 111A-F arranged in a carrier 110 in a 3×2 matrix array. This may be achieved by using three support towers 115, 116, 117, each of which is MASS-type as previously described, mounted on an assembly unit 129. The respective heads 119, 120, 121 of each support tower 115, 116, 117 each carry first and second support surfaces arranged in a linear array to underlie respective workpieces 111A-F in use, the first support surfaces 122A, 122C, 122E being at a greater height in the pre-printing configuration than the second support surfaces 122B, 122D, 122F. The operation of the tooling 114 is identical to that set out previously.

Figure 13:
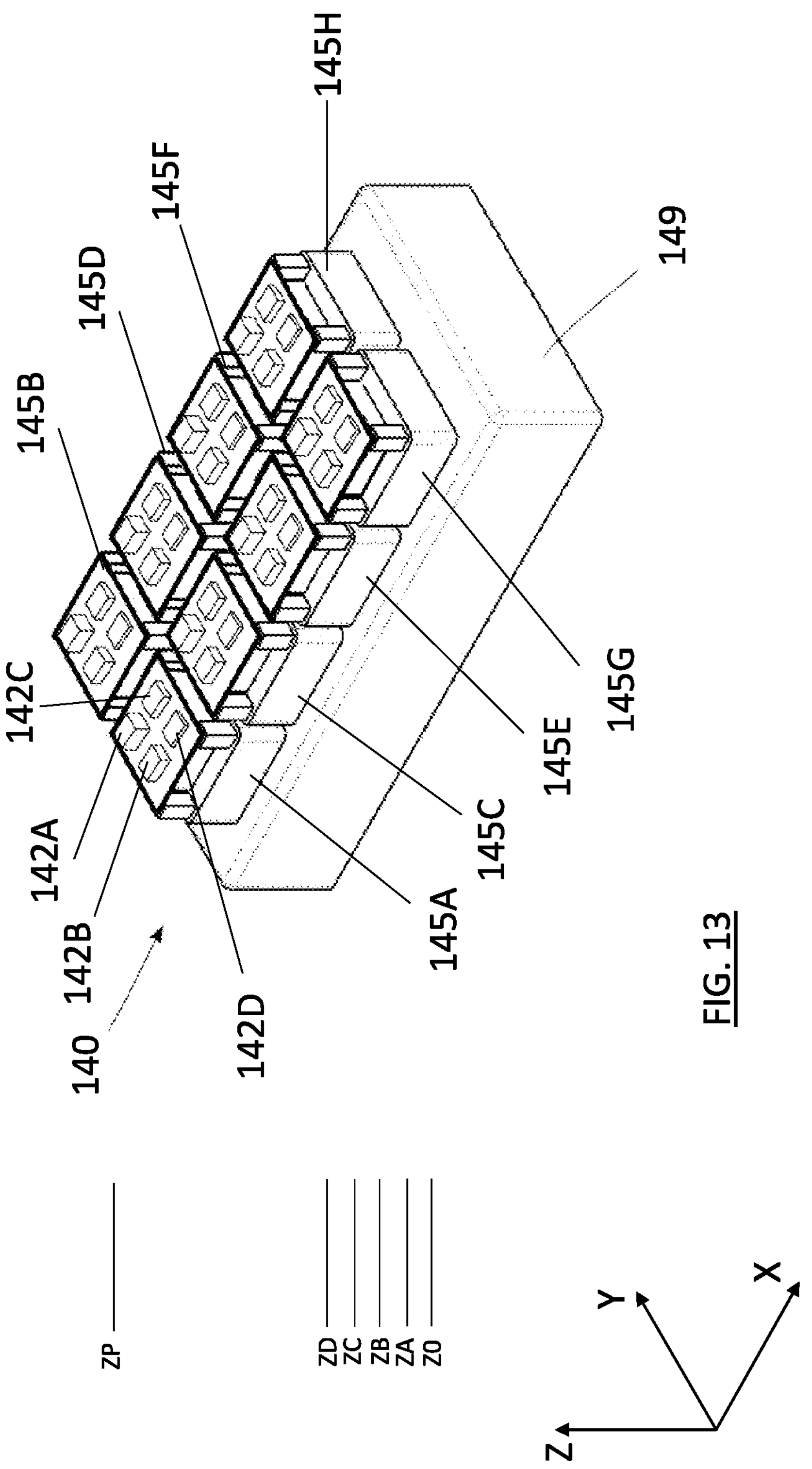
FIG. 13 schematically shows, in perspective view, tooling in accordance with a further embodiment of the present invention.

FIG. 13 schematically shows, in perspective view, tooling 140, which includes eight MASS-type support towers 145A-H, arranged in a 4×2 array on an assembly unit 149. The head of each support tower 145A-H carries four support surfaces 142A-D, arranged in a 2×2 square matrix array. Of these support surfaces, 142A-C may be considered "first support surfaces" which, similarly to first support surfaces 22A, 22C of the first-described embodiment, are relatively moveable with respect to the support surface 142D (i.e. a "second support surface") in a vertical direction in use between a printing configuration in which the first and second support surfaces are substantially coplanar in the horizontal plane, and a pre-printing configuration in which the first and second support surfaces are spaced in the vertical direction. In their pre-printing configurations shown, the support surfaces 142A-D are all spaced in the vertical direction, with support surface 142A being highest, followed by 142B, then 142C, with support surface 142D being the lowest support surface on the support tower. The tooling 140 is operated very similarly to that previously described. Overlying workpieces (not shown) are aligned as follows:

i) capturing fiducial information from the workpieces;
ii) support surface 142A is moved in the horizontal plane into alignment with its respective overlying workpiece;
iii) the tooling table (not shown) is lifted to a height ZA so that support surface 142A engages with its workpiece, vacuum is applied, and the workpiece is lifted out of engagement with the carrier (not shown);
iv) support surface 142B is moved in the horizontal plane into alignment with its respective overlying workpiece through movement of the respective heads;
v) the tooling table is lifted to a height ZB so that support surface 142B engages with its workpiece, vacuum is applied, and the workpiece is lifted out of engagement with the carrier;
vi) support surface 142C is moved in the horizontal plane into alignment with its respective overlying workpiece through movement of the respective heads;
vii) the tooling table is lifted to a height ZC so that support surface 142C engages with its workpiece, vacuum is applied, and the workpiece is lifted out of engagement with the carrier;
viii) support surface 142D is moved into alignment with its respective overlying workpiece through movement of the respective heads;
ix) the tooling table is lifted to a height ZD so that support surface 142D engages with its workpiece, vacuum is applied, and the workpiece is lifted out of engagement with the carrier; and
x) the support tower heads are moved in the horizontal plane such that the workpieces supported on all of the support surfaces 142A-D are aligned for the printing operation.

Following alignment, the workpieces may be printed by:

xi) further lifting the tooling table to height ZP such that the workpieces supported on the support surfaces 142A-D are brought to a printing height. During this step, the support surfaces 142A-C are brought to their printing configurations, so that all support surfaces 142A-D are substantially coplanar; and
xii) performing a printing operation.

As noted previously, GB2596517A describes how MASS-type tooling may be used to print a plurality of singulated substrates which are arranged at pitches in the transport direction that are smaller than the spacing of individual support towers, while GB Application No. 2117575.7 describes how such apparatus may be used to print a plurality of singulated substrates which are arranged at pitches orthogonal to the transport direction that are smaller than the spacing of individual support towers. Essentially both of these approaches implement a two-stage process, in which workpieces located at non-adjacent rows or columns of a carrier array are printed in a first print operation, while workpieces located at interspaced rows or columns of the carrier array are subsequently printed in a second print operation.

Such methodologies are entirely compatible with that of the present invention. By way of example, FIGS. 14A-E schematically show, from above, sequential steps in a method for aligning twenty-seven workpieces 211 arranged in a carrier 210 in a 9×3 matrix array (an example being a JEDEC 31 mm 9×3 tray), using tooling 214 comprising three support towers 215, 216, 217 mounted on an assembly unit 229. For convenience, the columns of workpieces are labelled as "1" to "9" above each column. Each support tower 215, 216, 217 includes a head which carries three support surfaces 222 arranged in a linear array, the support surfaces each corresponding to the dimension of a workpiece 211, and spaced by a pitch equal to the pitch of adjacent workpieces 211 in a column (i.e. the distance in the Y direction between each workpiece aligned in the X direction) in the carrier 210. Of these, support surfaces 222A and 222B may be considered "first support surfaces" which, similarly to the first support surfaces 22A, 22C of the first-described embodiment, are relatively moveable with respect to the support surface 222C (i.e. a "second support surface") in a vertical direction in use between a printing configuration in which the first and second support surfaces are substantially coplanar in the horizontal plane, and a pre-printing configuration in which the first and second support surfaces are spaced in the vertical direction. In their pre-printing configurations shown, the support surfaces 222A-C are all spaced in the vertical direction, with support surface 222A being highest, followed by 222B, with support surface 222C being the lowest support surface on the support tower. The tooling 214 may be operated very similarly to that previously described, and so this aspect will not be described in depth again. It can be seen that the pitch between adjacent columns of workpieces 211 (i.e. the distance in the X direction between each column of three workpieces aligned in the Y direction) in the carrier 210 is smaller than the pitch between adjacent support towers 215, 216, 217.

Figure 14A:
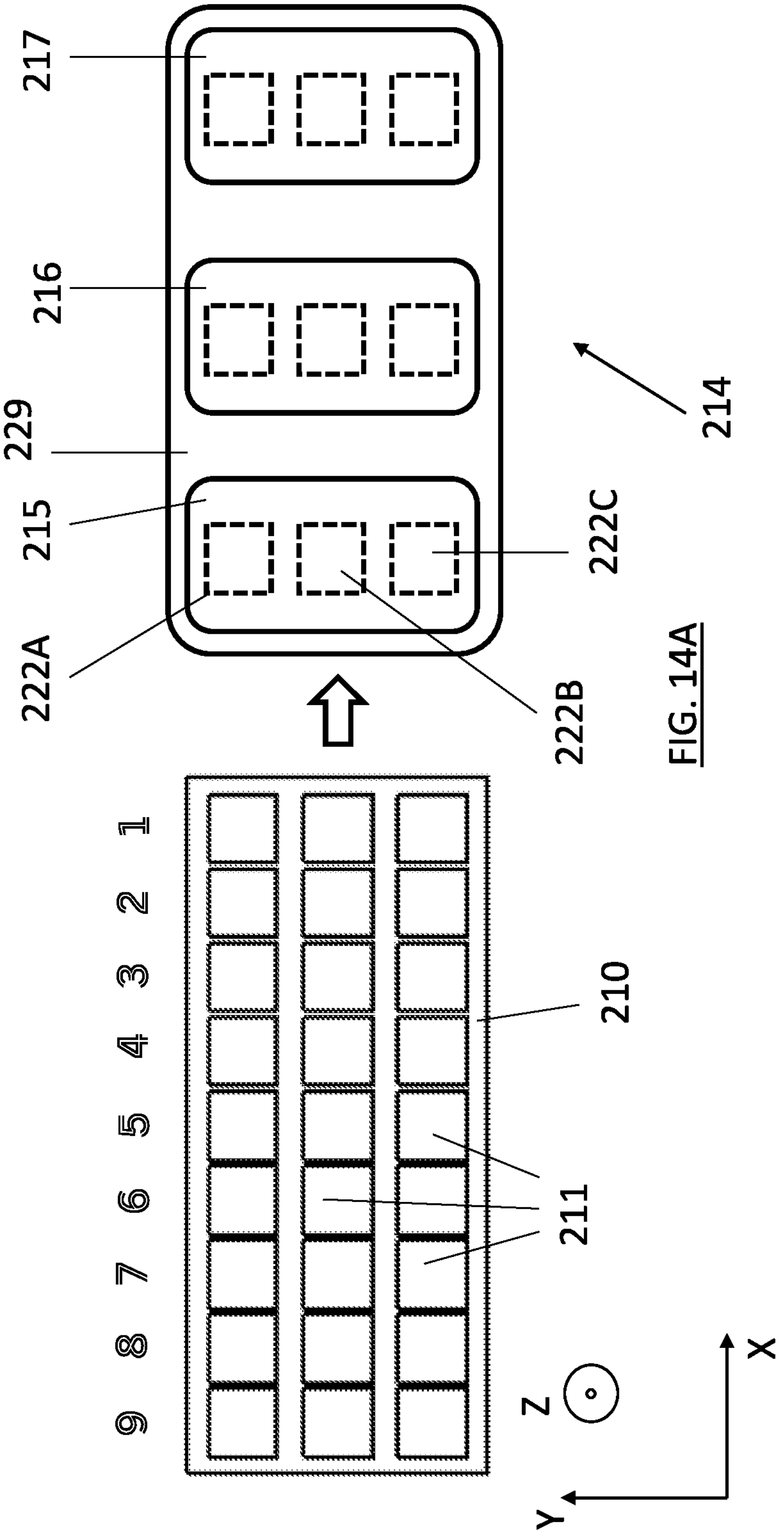
FIGS. 14A-E schematically show, from above, sequential steps in further exemplary method for aligning workpieces.

In the step shown in FIG. 14A, the carrier 210 with its unprinted and unaligned workpieces 211 is shown prior to being transported to the printing location overlying the tooling 214.

Figure 14B:
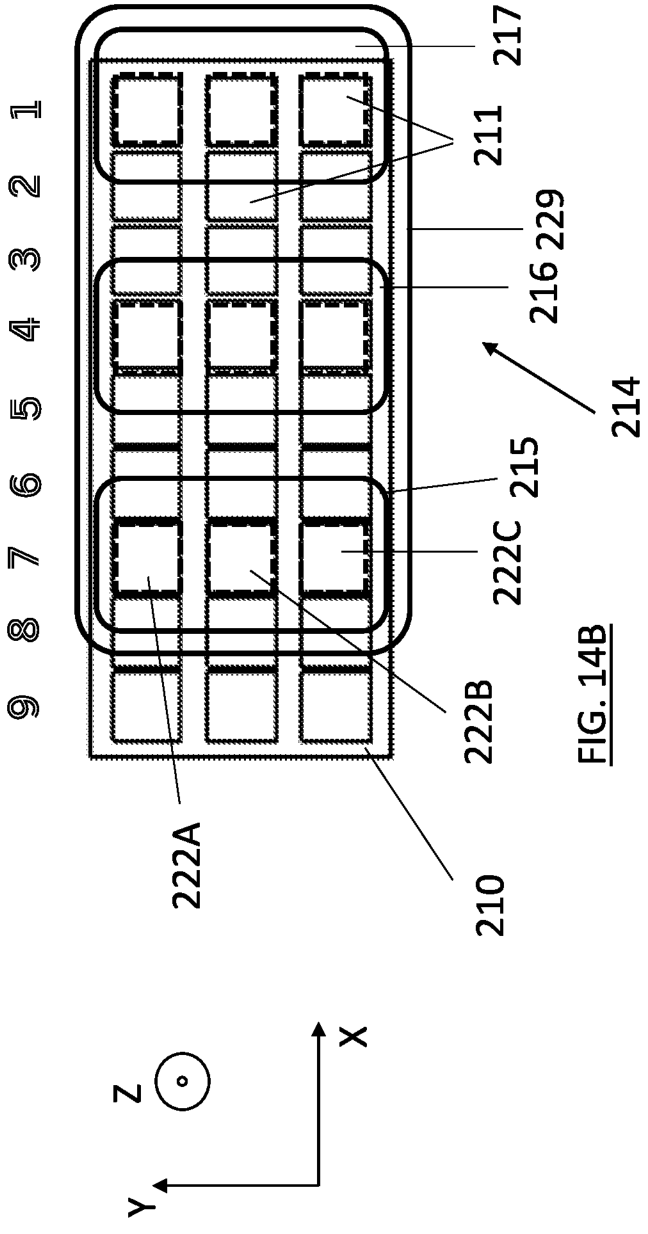

In the subsequent step shown in FIG. 14B, the carrier 210 with its unprinted and unaligned workpieces 211 is shown having been transported to the printing location, so that workpieces 211 in its rightmost column "1" overlie the respective support surfaces 222A-C of support tower 217, while workpieces 211 in column "4" overlie the respective support surfaces 222A-C of support tower 216, and workpieces 211 in column "7" overlie the respective support surfaces 222A-C of support tower 215. Once in this position, the workpieces in those columns are aligned as previously described, and are then printed as previously described.

Figure 14C:
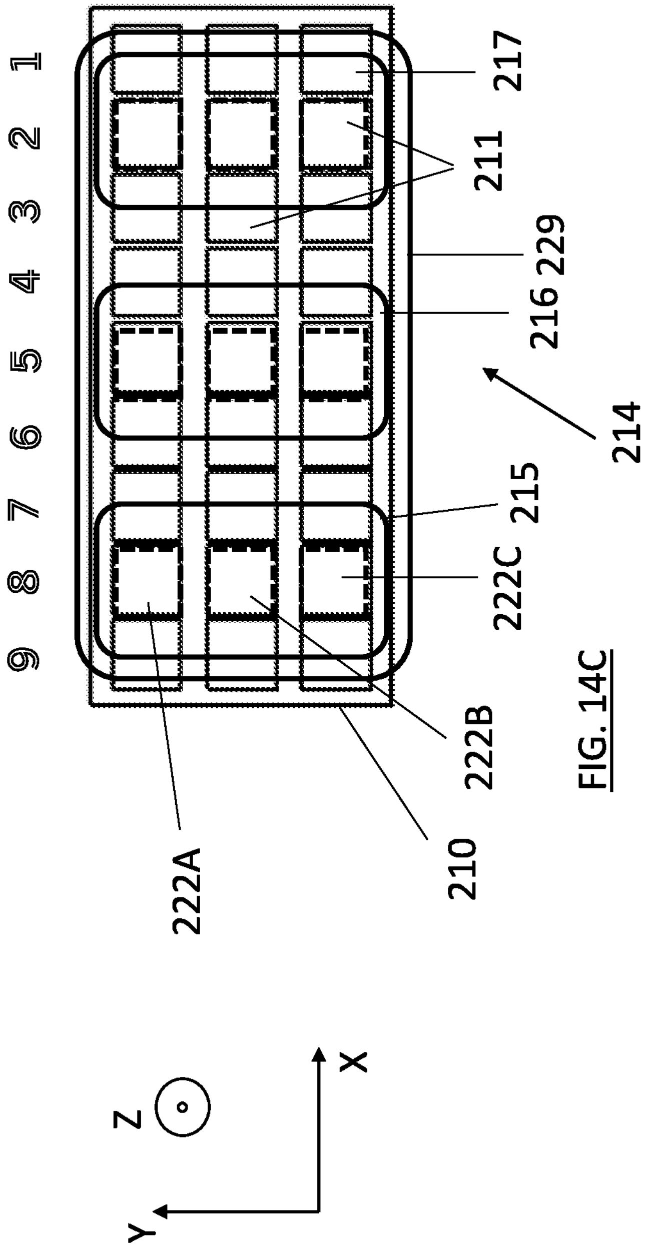

In the subsequent step shown in FIG. 14C, the carrier 210 with its unprinted and unaligned workpieces 211 is shown having been transported by one pitch in the X direction, so that workpieces 211 in its second rightmost column "2" overlie the respective support surfaces 222A-C of support tower 217, while workpieces 211 in column "5" overlie the respective support surfaces 222A-C of support tower 216, and workpieces 211 in column "8" overlie the respective support surfaces 222A-C of support tower 215. Once in this position, the workpieces in those columns are aligned as previously described, and are then printed as previously described.

Figure 14D:
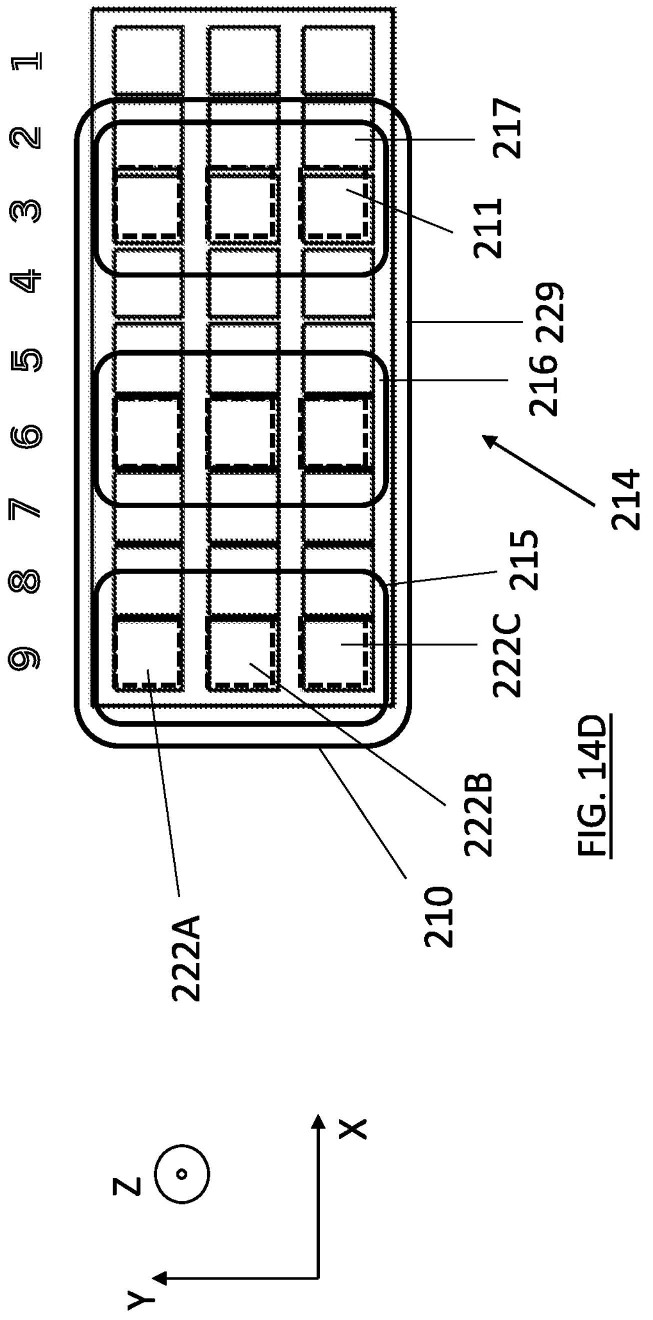

In the subsequent step shown in FIG. 14D, the carrier 210 with its unprinted and unaligned workpieces 211 is shown having been transported by one pitch in the X direction, so that workpieces 211 in its third rightmost column "3" overlie the respective support surfaces 222A-C of support tower 217, while workpieces 211 in column "6" overlie the respective support surfaces 222A-C of support tower 216, and workpieces 211 in column "9" overlie the respective support surfaces 222A-C of support tower 215. Once in this position, the workpieces in those columns are aligned as previously described, and are then printed as previously described.

Figure 14E:
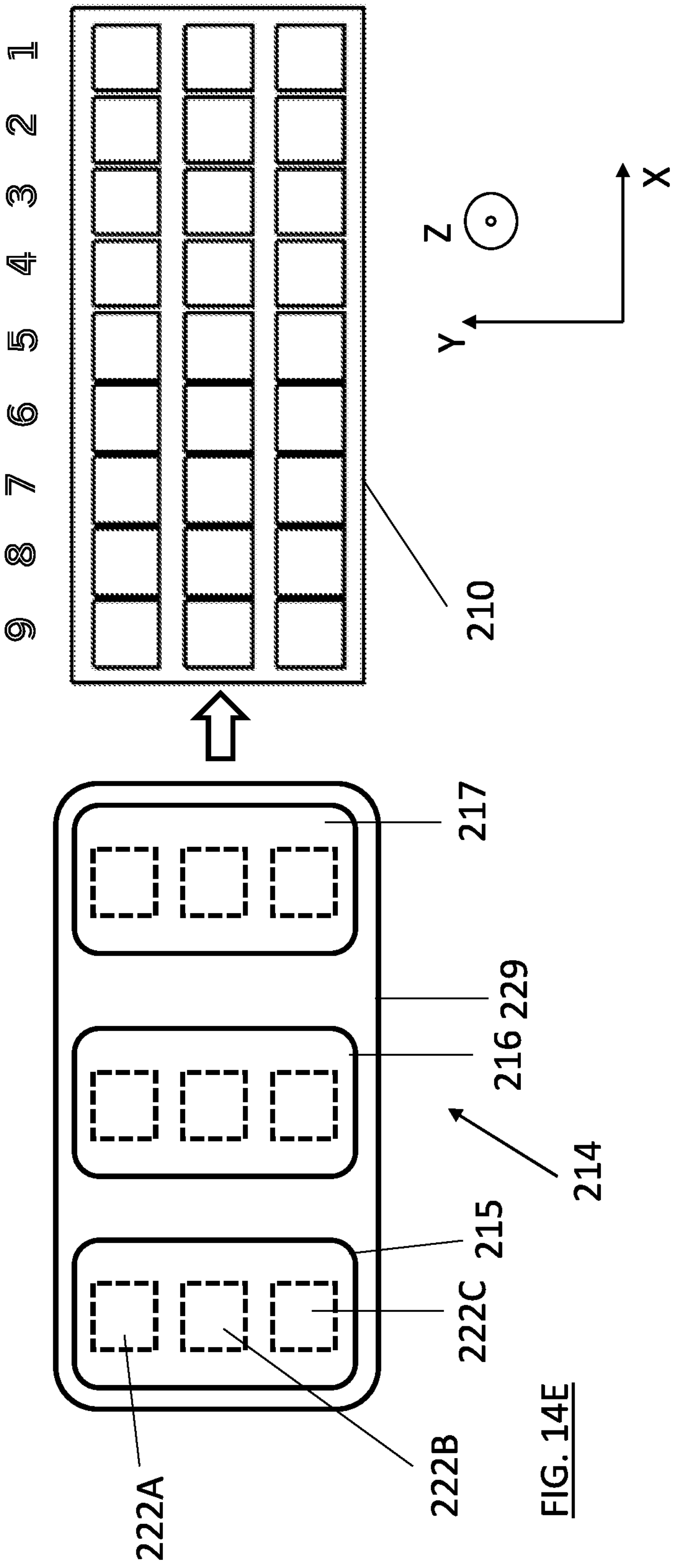

Finally, as shown in FIG. 14E, the carrier 210, in which all workpieces have been aligned and printed, is transported away from the printing location in the X direction, and on to other modules of a production line as required.

Figure 15:
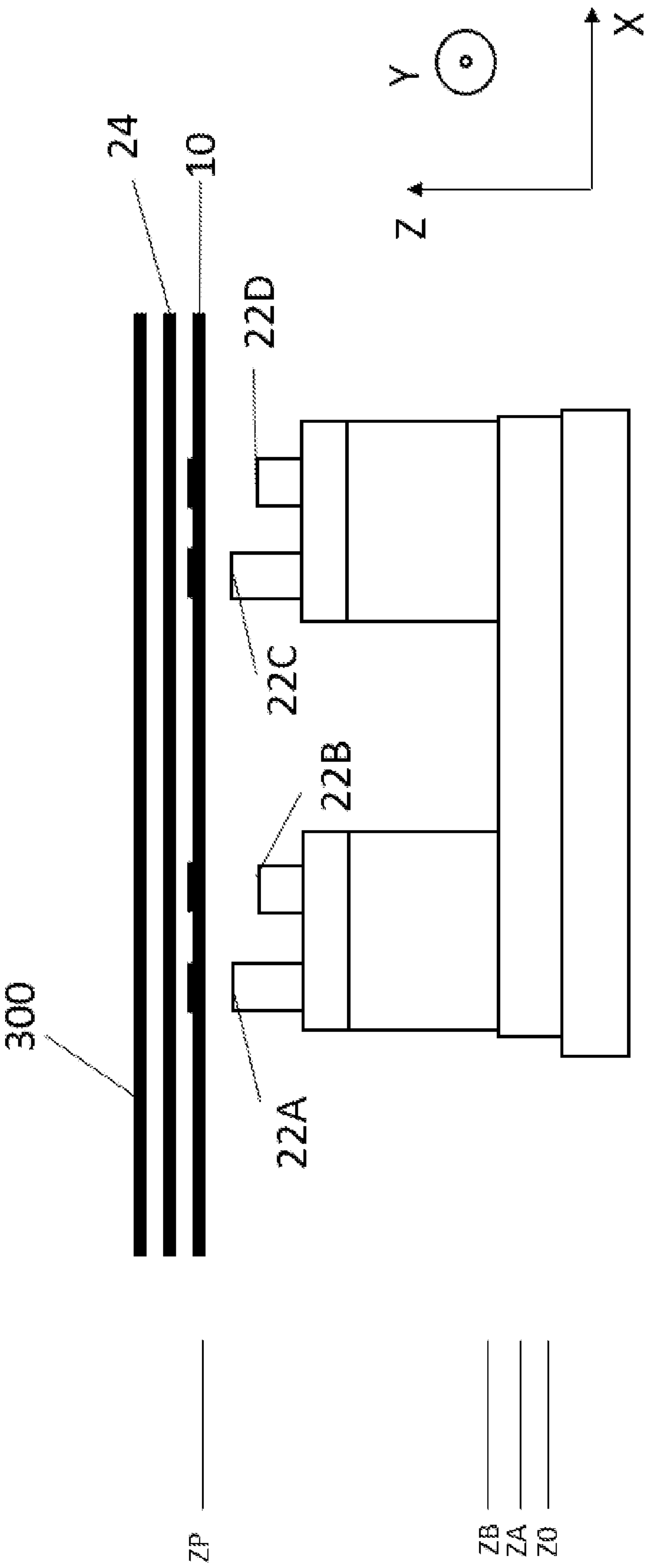
FIG. 15 schematically show, in a side view, a further embodiment of the present invention.

A further embodiment of the present invention is schematically shown, in a side view, in FIG. 15. The arrangement shown is very similar to that shown in FIG. 5, except that as shown, a referencing plate 300 is provided parallel to and vertically above the surround plate 24. Referencing plates are used in some configurations of certain printing machines to actively align singulated workpieces if a MASS-type tooling is not used. An exemplary referencing system which uses two adjacent referencing plates is for example fully described in US2021/0070033A1, which describes aligning workpieces by sliding, in the horizontal plane, at least one of the referencing plates to contact edges of the singulated workpieces and impel them into correct alignment. In the embodiment shown in FIG. 15, the limiting member comprises at least part of the referencing plate 300, i.e. either a member provided on the referencing plate specifically for abutting with the projection, or the projection is dimensioned to abut with a 'normal' referencing plate itself, which does not include any additional member provided for this purpose. As will be understood by those skilled in the art, such referencing plates are retracted from the printing location before commencement of a printing operation.

The above-described embodiments are exemplary only, and other possibilities and alternatives within the scope of the invention will be apparent to those skilled in the art.

REFERENCE NUMERALS USED

1, 2, 3—Panels
1A-3D—Boards
4—Workpiece support assembly
5—Towers
6—Support surfaces
110—Carrier
11, 11A-D—Unprinted workpieces
12—Tooling table
13—Tooling table upper surface
14, 114, 140—Tooling
16, 115, 116, 117, 145A-H—Support towers
17, 18—Bases
19, 20, 119, 120, 121—Heads
21A-D—Supports
22A, 22C, 122A, 122C, 122E, 222A, 222B—First support surfaces
22B, 22D, 122B, 122D, 122F, 222C—Second support surfaces
23—Workpiece fiducials
24—Surround plate
25—Printing screen
26—Camera
27—Squeegee
28—Printing machine
29, 129, 149, 229—Assembly unit
300—Referencing plate
50—Actuator
51—Projection
52—Limiting member
53—Compression spring

The invention claimed is:

1. Tooling for supporting workpieces during a printing operation, comprising:

a support tower comprising a base and a head, the head being positioned vertically above the base in use, the head being relatively moveable with respect to the base in a horizontal plane in use, the head having first and second support surfaces located at an upper end thereof, each of the first and second support surfaces being adapted to support a respective workpiece thereon, wherein the first support surface is relatively moveable with respect to the second support surface in a vertical direction in use between a printing configuration in which the first and second support surfaces are substantially coplanar in the horizontal plane, and a pre-printing configuration in which the first and second support surfaces are spaced in the vertical direction; and wherein the tooling comprises means for moving the first support surface downwards relative to both the second support surface and the base as the tooling moves from the pre-printing configuration to the printing configuration, the means is an actuator operative to drive the first support surface or a projection for abutting with a limiting member.

2. The tooling of claim 1, wherein the head comprises at least one additional support surface, and wherein in respective pre-printing configurations the first and second support surfaces and each additional support surface are all spaced in the vertical direction.

3. The tooling of claim 2, wherein the first and second support surfaces and each additional support surface are arranged in a linear array on the head.

4. The tooling of claim 2, wherein the first and second support surfaces and each additional support surface are arranged in a two-dimensional matrix array on the head.

5. The tooling of claim 1, wherein the support tower comprises an actuator for driving the head in the horizontal plane relative to the base.

6. The tooling of claim 5, wherein the actuator is operative to drive the head in orthogonal X and Y directions within the horizontal plane, and also to rotate the head about a vertical axis.

7. The tooling of claim 1, wherein the first support surface is resiliently biased to the pre-printing configuration.

8. The tooling of claim 1, wherein the projection is located at the first support surface to abut the limiting member such that lifting of the first support surface is prevented during lifting of the support tower when the projection abuts with the limiting member.

9. The tooling of claim 1, wherein the actuator is a Z-axis actuator associated with the first support surface operative to drive the first support surface downwards relative to the second surface.

10. A printing machine for printing workpieces at a printing location within the printing machine, comprising:

a transport system configured to transport workpieces into the printing machine and to the printing location, and then, following completion of a printing operation, out of the printing machine;

a printing screen support for holding a patterned printing screen above the printing location;

a tooling table located underneath the printing location, the tooling table being driveable towards and away from the printing location; and the tooling of claim 1 mounted on the tooling table.

11. The printing machine of claim 10, wherein the transport system is configured to transport a carrier into the printing machine and to the printing location, and then, following completion of a printing operation, out of the printing machine, the carrier adapted to carry a plurality of workpieces.

12. The printing machine of claim 10, comprising a limiting member arranged to abut with the first support surface to limit the vertical position of the first support surface during upward driving of the tooling table.

13. The printing machine of claim 12, wherein the limiting member comprises at least part of a surround plate which comprises at least one aperture, the at least one aperture overlying a respective workpiece when in the printing location.

14. The printing machine of claim 12, wherein the limiting member comprises at least part of a referencing plate.

15. The printing machine of claim 10, comprising a camera system for determining the orientation of workpieces which have been transported to the printing position.

16. The printing machine of claim 15, wherein the camera system comprises a camera located at a vertical height between the transport system and the printing screen in use, optionally the camera is driveable in the horizontal plane to overlie and scan individual workpieces consecutively.

* * * * *